US012625509B2

(12) United States Patent
Van Der Upwich

(10) Patent No.: US 12,625,509 B2
(45) Date of Patent: May 12, 2026

(54) FLUID FLOW REGULATOR

(71) Applicants: HaGePe International B.V., Huizen (NL); Cenergist Limited, Washington (GB)

(72) Inventor: Stijn Van Der Upwich, Enkjuizen (NL)

(73) Assignees: HAGEPE INTERNATIONAL B.V., Huizen (NL); CENERGIST LIMITED, Washington (GB)

( * ) Notice: Subject to any disclaimer, the term of this patent is extended or adjusted under 35 U.S.C. 154(b) by 0 days.

(21) Appl. No.: 17/626,004

(22) PCT Filed: Jul. 10, 2020

(86) PCT No.: PCT/NL2020/050458
§ 371 (c)(1),
(2) Date: Jan. 10, 2022

(87) PCT Pub. No.: WO2021/010828
PCT Pub. Date: Jan. 21, 2021

(65) Prior Publication Data
US 2022/0276663 A1     Sep. 1, 2022

(30) Foreign Application Priority Data
Jul. 12, 2019   (NL) ..................................... 2023495

(51) Int. Cl.
G05D 7/01       (2006.01)
F16K 15/06     (2006.01)
F16K 15/14     (2006.01)
(52) U.S. Cl.
CPC .......... G05D 7/0113 (2013.01); F16K 15/063 (2013.01); F16K 15/148 (2013.01); G05D 7/012 (2013.01)

(58) Field of Classification Search
CPC .... G05D 7/0113; G05D 7/012; F16K 15/063; F16K 15/148
USPC ............... 251/359; 138/40; 137/513.3, 513.5
See application file for complete search history.

(56) References Cited

U.S. PATENT DOCUMENTS

| | | | | |
|---|---|---|---|---|
| 2,622,613 | A | * | 12/1952 | Daniel .................... F16K 17/08 |
| | | | | 137/513.3 |
| 3,995,656 | A | | 12/1976 | Mills |
| 4,103,705 | A | * | 8/1978 | Wagner ................... F16K 17/19 |
| | | | | 137/533.27 |
| 4,147,096 | A | * | 4/1979 | Caswell ................. F16K 24/04 |
| | | | | 137/533.27 |
| 4,177,831 | A | * | 12/1979 | Benjamin ............... F16K 17/14 |
| | | | | 137/513.5 |

(Continued)

FOREIGN PATENT DOCUMENTS

| | | |
|---|---|---|
| GB | 2601607 | 6/2022 |
| JP | S59-123259 | 7/1984 |

(Continued)

*Primary Examiner* — Jessica Cahill
(74) *Attorney, Agent, or Firm* — MH2 Technology Law Group, LLP

(57) ABSTRACT

A fluid flow regulator (10) comprising: a valve chamber (12) having a fluid inlet (14a) and a fluid outlet (14b); and a valve member (16) inside the valve chamber (12), the valve member (16) moveable inside the valve chamber (12); wherein the valve member (16) is concave in the direction of the fluid inlet and convex in the direction of the fluid outlet.

22 Claims, 3 Drawing Sheets

(56) References Cited

U.S. PATENT DOCUMENTS

| | | | | |
|---|---|---|---|---|
| 5,189,877 A * | 3/1993 | Wells | F01N 3/30 | |
| | | | 137/513.5 | |
| 5,203,365 A | 4/1993 | Velie | | |
| 5,819,794 A * | 10/1998 | Anderson | F01L 1/02 | |
| | | | 137/543.17 | |
| 6,123,528 A * | 9/2000 | Sun | F16K 15/031 | |
| | | | 251/303 | |
| 6,145,536 A * | 11/2000 | Gerhard | B60K 15/077 | |
| | | | 123/514 | |
| 6,311,712 B1 * | 11/2001 | Meyer | G05D 7/0146 | |
| | | | 137/271 | |
| 6,523,571 B1 * | 2/2003 | Kim | F04B 39/1073 | |
| | | | 137/856 | |
| 6,571,407 B1 * | 6/2003 | Skarie | E03C 1/0401 | |
| | | | 137/359 | |
| 8,763,644 B2 * | 7/2014 | Tsai | F15D 1/025 | |
| | | | 138/46 | |
| 8,973,596 B2 * | 3/2015 | Hull | B05B 7/0408 | |
| | | | 204/647 | |
| 10,641,260 B2 * | 5/2020 | Rowland | F04B 39/10 | |
| 11,592,847 B2 * | 2/2023 | Van Der Upwich | G05D 7/0113 | |
| 2003/0029885 A1 * | 2/2003 | Kawolics | F16K 15/148 | |
| | | | 222/105 | |
| 2004/0182447 A1 * | 9/2004 | Nicolino | F16K 15/1402 | |
| | | | 137/513.5 | |
| 2005/0145284 A1 * | 7/2005 | Sarajian | F16K 17/02 | |
| | | | 137/854 | |
| 2005/0257838 A1 * | 11/2005 | Enerson | F16K 15/023 | |
| | | | 137/528 | |
| 2006/0086393 A1 * | 4/2006 | Bailey | G05D 7/012 | |
| | | | 137/601.18 | |
| 2009/0242045 A1 * | 10/2009 | Jennings | F16K 27/0236 | |
| | | | 137/510 | |
| 2010/0069830 A1 * | 3/2010 | Grigorov | A61M 5/1456 | |
| | | | 604/67 | |
| 2010/0319784 A1 * | 12/2010 | Kuhne | G05D 7/012 | |
| | | | 137/511 | |
| 2012/0180875 A1 | 7/2012 | Keller | | |
| 2014/0124599 A1 * | 5/2014 | Zhou | E03C 1/086 | |
| | | | 239/428.5 | |
| 2014/0137970 A1 * | 5/2014 | Bosio | G05D 7/012 | |
| | | | 138/40 | |
| 2016/0089070 A1 * | 3/2016 | Russ | A61B 5/154 | |
| | | | 600/579 | |
| 2019/0285196 A1 * | 9/2019 | Giusti | B81C 1/00182 | |
| 2020/0124182 A1 * | 4/2020 | Abouelleil | F16K 47/023 | |
| 2022/0276663 A1 | 9/2022 | Van Der Upwich | | |

FOREIGN PATENT DOCUMENTS

| | | | | |
|---|---|---|---|---|
| JP | 2002530769 | 9/2002 | | |
| NL | 1041040 | 8/2016 | | |
| WO | WO-9603166 A1 * | 2/1996 | | A61M 5/16881 |
| WO | 2015069114 | 5/2015 | | |
| WO | 2021010828 | 1/2021 | | |

* cited by examiner

FLUID FLOW REGULATOR

The present invention relates to a fluid flow regulator, normally a fluid flow regulator for regulating the flow of water.

To reduce water consumption, many water utility companies in Europe have been and are still reducing the pressure of mains water supplies. By doing so they reduce water and energy consumption and reduce leakage from pipes. At the same time the pressure of water flowing into buildings may be reduced by the demands on the system at any given time.

It is particularly difficult to regulate fluid flow over a range of different pressures. Many existing fluid flow regulators do not function properly over a range of different pressures, resulting in fluid flows that vary too much to be effective.

In view of the need to reduce water consumption and regulate fluid flow, the inventor of the present invention has invented an effective fluid flow regulator.

In accordance with a first aspect of the present invention there is provided a fluid flow regulator comprising:
 a valve chamber having a fluid inlet and a fluid outlet; and
 a valve member inside the valve chamber, the valve
  member moveable inside the valve chamber;
 wherein the valve member is concave.

The valve member is normally concave in the direction of and/or adjacent to the fluid inlet and/or convex in the direction of and/or adjacent to the fluid outlet.

The fluid flow regulator may reliably and/or reproducibly regulate fluid flow when the pressure of fluid supplied to the fluid inlet is from 1.5 to 10 bar. In use, the variation in flow rate of fluid passing out the fluid outlet should preferably (on average) be less than 2%, more preferably less than 1%, at varying fluid pressures and/or flow rates of fluid supplied to the fluid inlet.

Also, when increasing the pressure of fluid supplied to the fluid inlet when cycling from a minimum to a maximum and back to the minimum working pressure, the variation in flow rate of fluid passing out the fluid outlet on a first, increasing part of the cycle, should preferably (at any given pressure in the pressure range) be less than 5%, when compared to the flow rate of fluid passing out the fluid outlet on a second, decreasing part of the cycle. In other words, the flow regulator should preferably operate with this very low hysteresis; preferably operate with substantially no hysteresis.

As said, the variation in flow rate of fluid passing out the fluid outlet at any given fluid pressure should thus preferably be less than 5% when fluid pressure is increasing when compared to when fluid pressure is decreasing. The variation in flow rate of fluid passing out the fluid outlet is more preferably less than 2%, even more preferably less than 1%, when the fluid pressure is cycling between its upper and lower working pressure limits and vice versa. An upper limit may be a relatively high pressure, for example be 5 bar or 10 bar or anything in between. A lower limit may be a relatively low pressure, for example be 1.5 bar or 2 bar or anything in between.

The fluid flow regulator may thus reliably and/or reproducibly regulate fluid flow when the pressure of fluid supplied to the fluid inlet is preferably from 1.5 to 10 bar.

Pressures referred to herein are typically also referred to as dynamic fluid pressures and/or working fluid pressures. That is the pressures referred to herein are typically dynamic fluid pressures not static fluid pressures. As said, dynamic fluid pressure may be referred to as working pressure.

It is typically the concave and/or convex shape of the valve member that contributes to the abovementioned relatively small variation in fluid flow rate compared to known fluid flow regulators. The relatively small variation in fluid flow rate may be an extremely small variation in fluid flow rate. The concave and/or convex shape of the valve member is major contributor for an increased pressure range across which the fluid flow regulator can provide at least substantially pressure-independent fluid flow. The at least substantially pressure-independent fluid flow may be practically pressure-independent fluid flow.

The concave valve member may be and/or may be referred to as one or more of dished (i.e. dish shaped); curved; depressed; sunken; indented; recessed; or not flat.

The valve member is thus shaped to be concave in a position (i.e. state) at rest, i.e. when the fluid flow regulator is not in use. In this position at rest, the valve member is thus concave in its initial, undeformed state. By arranging the valve member moveable inside the valve chamber, it is arranged to adjustably restrict the flow of fluid through the valve chamber.

In use the valve chamber defines a flow path and/or boundary between the fluid inlet and the fluid outlet. The fluid flow regulator may for instance comprise a housing provided with the inlet and the outlet and the valve chamber there between. The valve member is preferably arranged in the housing and is movable to and from a valve seat, defining a flow opening there between. The valve member will be movable under the influence of a pressure of the fluid and is arranged to adjust the size of the flow opening in dependence of the pressure of the fluid and/or flow rate, such that the flow of liquid is substantially constant over a pressure range. To ensure a flow of liquid through the opening even at higher pressures, i.e. to prevent full closure of the flow opening, the valve seat is preferably provided with a least one protruding member for limiting the movement of the valve member towards the valve seat.

The fluid flow regulator typically regulates the flow of liquid, optionally the flow of water. In use water typically flows through the fluid flow regulator. In use, from 1.5 to 12 L/min; optionally from 1.5 to 3.5 L/min; typically from 2 to 3 L/min, 4 to 10 L/min; typically from 7.5 to 8.5 L/min; and up to 50 L/min or more water may flow through the flow regulator.

In use the valve member moves relative to the valve chamber, preferably towards and from the valve seat as describes above, to provide a flow of fluid from the fluid outlet at a pressure and/or flow rate that is substantially independent of the pressure and/or flow rate of the fluid supplied to the fluid inlet. The at least substantially pressure-independent fluid flow may be practically pressure-independent fluid flow. In use, the pressure and/or flow rate of fluid from the fluid flow regulator typically varies by equal to or less than 2%.

An outer edge of the valve member is typically partially or substantially circular. The radius of the valve member is typically from 3.5 to 10 mm, normally from 3.5 to 5 mm, may be approximately 4 mm, or normally from 5 to 8 mm, may be approximately 7, and may be 6.97 mm, or at least 8 mm, normally 9 mm preferably, the valve seat has a corresponding shape.

The valve member may be or may be referred to as a disc. The valve member is typically a movable obstruction inside the valve chamber. The valve member is normally used to adjustably restrict the flow of fluid through the valve chamber.

In use, the valve member typically moves linearly inside the valve chamber and/or moves relative to the longitudinal axis of the valve chamber, preferably towards and away from the valve seat under the influence of the pressure of the fluid and/or flow rate.

The valve member may comprise a tab for locating the valve member inside the valve chamber. The tab may be contactable and/or locatable with a portion of the valve chamber. The valve member may have an aperture in it for positioning the valve member inside the valve chamber. The valve chamber may comprise a post, the aperture in the valve member is typically locatable over the post. That is the post is passable through the aperture when the valve member is inside the valve chamber.

The valve member is moveable inside the valve chamber and typically contactable with the valve seat inside the valve chamber. The valve member is typically moveable relative to the valve seat. The tab may allow the valve member to be pivotable relative to the valve seat.

The valve seat may have a radial width of greater than 1.5 mm, optionally greater than 1.75 mm and typically 1.97 mm. The valve seat may have a radial width of from 1.75 to 2.25 mm.

The valve member is typically deformable and may be elastically deformable. That is in use, the shape of the valve member is changeable. The deformable valve member normally changes shape depending on the pressure and/or fluid flow rate of fluid in contact with it and/or the pressure and/or the fluid flow rate of fluid supplied to the fluid inlet of the fluid flow regulator.

The characteristics of the valve member depend on its concave shape and deformability. The same characteristics cannot be achieved if the valve member is flat. A flat valve member may not respond adequately to fluctuations in input fluid pressure. The result is that in use, the output fluid pressure can sometimes vary more than is wanted. A flat valve member may adequately control outlet fluid pressure and/or flow rate when the input fluid pressure and/or flow rate is relatively high or low but not when the input fluid pressure varies over a range of from 1.5 to 10 bar. Adequate control typically means stable outlet fluid pressure and/or flow rate.

The valve member of the present invention may be a spring and/or the behaviour of the valve member in use may be described as spring-like.

The concave and/or convex shape of the valve member typically makes the fluid flow regulator suitable for operation at low and/or high fluid pressure and pressures in between. The concave and/or convex shape of the valve member typically makes the fluid flow regulator suitable for operation at low and/or high fluid temperatures.

The concave and/or convex valve member is typically more rigid and/or stronger and/or harder to bend compared to a flat valve member. It may be that the more rigid and/or stronger and/or harder to bend concave and/or convex valve member can provide the advantage that the outlet fluid flow rate is adequately controlled, for instance when the input fluid pressure is from 1.5 to 10 bar. In use, at from 1.5 to 10 bar dynamic fluid pressure, the flow rate may be from 4 to 10 L/min, optionally from 7.5 to 8.5 L/min, normally about 8 L/min, preferably 7.8 L/min, or 1.5 to 3.5 L/min; typically from 2 to 3 L/min, or more than 40 L, typically 50 L In use, the fluid flow regulator can continue to adequately function when there are particulates in the fluid flow, as a strainer can be provided at the fluid inlet, the strainer comprising openings and/or holes that are smaller than holes, openings and/or through flow openings arranged in the fluid flow regulator downstream of the strainer, such that particles, such as solids, that are allowed to flow through the strainer will typically flow through the fluid flow regulator and exit at the fluid outlet. Larger particles will not be allowed to flow through the strainer into the fluid flow regulator.

The concave and/or convex shape of the valve member may be referred to as its convexity. The convexity of the valve member may be described as the curved shape and/or curvature of the valve member.

The valve member may have a curved shape such that the perpendicular distance from a line parallel with a lowermost surface of the convex side of the valve member and an uppermost edge of the concave side of the valve member is, preferably from 0.005 to 0.1 mm, more than the average thickness of the valve member, preferably from 0.01 to 0.03 mm. The distance may be from 0.015 to 0.025 mm, typically 0.02 mm more than the average thickness of the valve member. The average thickness of the valve member may be referred to as the nominal thickness of the valve member. The valve member may have a curvature with a radius from 800 to 1200 mm, preferably 900 to 1100 mm and most preferably approximately 1000 mm.

A fluid flow regulator is thus obtained for delivery of fluid at 4 to 10 L/min, specifically from 7.5 to 8.5 L/min, normally about 8 L/min, preferably 7.8 L/min. For fluid flow regulators according to the present invention that are designed for delivery of fluid at flow rates other than 7.8 L/min, the perpendicular distance may be different but substantially proportional to the difference in required flow rate.

The distance does not typically include any burr or lip on an edge, typically the upper edge of the convex side of the valve member.

The lowermost surface or lowermost point of the valve member is typically at a mid-point between an outermost surface of the tab of the valve member and an opposing outermost edge of the valve member.

The thickness of the valve member may be from 0.1 mm to 2.5 mm, typically from 0.2-1.5 mm, more typically from 0.25 to 0.5 mm, normally from 0.35 to 0.4 mm, may be 0.392 mm, all ±0.02 mm.

The inventors of the present invention have realised that batches of the material used to make the valve member vary in thickness, typically within a known tolerance, but that this variation in thickness will typically, in use, cause significant variation of the flow rate of fluid from the fluid flow regulator. The inventors of the present invention have developed a fluid flow regulator that can be reliably and reproducibly produced and that in use provides a reliable and reproducible flow rate of fluid. The concave shape of the valve member mitigates the aforementioned effects of variations in the thickness of the material of the valve member.

The concave and/or convex shape of the valve member, also referred to as its convexity, may be varied so as to vary the flow rate of fluid that will flow through and/or out of the fluid flow regulator. If the valve member was flat, the thickness of the material of the valve member would typically have to be changed every time the flow rate or flow rating was to be changed. Instead, by varying the concave and/or convex shape of the valve member, also referred to as its convexity, the flow rate or flow rating of the fluid flow regulator can be more readily changed as required.

The valve chamber is typically made of plastic may be glass-filled polymer and/or glass-filled plastic. The valve member is typically made of stainless steel, preferably spring steel.

According to a further embodiment, a lower surface of the valve member has an asymmetrical height distribution. This reduces any vibrations in the fluid flow regulator. As the fluid flow regulator, in particular the valve seat thereof, preferably has a symmetrical configuration for gradually receiving or contacting the valve member, the asymmetrical configuration of the lower surface of the valve member will result in a stepwise contact of the parts, thereby reducing vibrations.

Preferably, a first edge portion of the valve member is located out of the plane of a second edge portion opposite the first edge portion of the valve member. Opposite edges of the valve member hereby preferably make contact with the valve seat, wherein the asymmetric or varying lower surface of the edges will reduce any vibrations.

Preferably, the lower surface of the valve member will contact the valve seat at two opposite edge portions. Upon increasing pressure or fluid flow, a larger part of the valve member will bend and gradually move towards the valve seat, thereby decreasing the flow opening between the valve member and the valve seat. As the valve seat, at least the part for cooperating with the valve member such as the protruding member as mentioned above, has a symmetrical configuration, the asymmetrical configuration of the opposite edge portions will have the effect that given a certain pressure or flow, only a first edge will contact the valve seat, wherein the opposite edge will only contact the valve seat upon further increase of the pressure.

Preferably, the valve member comprises a tab or other member for locating the valve member inside the chamber, the tab being locatable with a portion of the valve chamber, wherein seen in a cross-sectional plane perpendicular to a line between an outermost surface of the tab and an opposing outmost edge of the valve member, the lower surface of the valve member has an asymmetrical shape. The edges at either side of the line connecting the tab and the opposite edge will thus—at least in a resting position—extend at different locations, seen in the direction perpendicular to the surface of the valve member.

According to a further preferred embodiment, the valve member is movable relative to a valve seat defining a flow opening there between, wherein at least in a resting position, a distance between a first edge of the valve member and the valve seat is different from a distance between a second edge opposite the first edge of the valve member and the valve seat. Upon increasing pressure or flow, a first edge will contact the valve seat first, wherein the second edge will only contact upon increasing pressure or flow. Said opposite edges being defined as being on opposite sides, preferably directly opposite each other, of a line of substantial mirror symmetry of the respective valve seat.

Preferably, the valve seat is provided with a at least one first protruding member for engaging a first edge portion of the valve member and at least second protruding member located opposite the first protruding member for engaging the second edge portion. The distance between the valve member and the first and second protruding members hereby differs. Preferably, the distance between a first edge of the valve member and first protruding member is different from a distance between a second edge opposite the second protruding member, wherein the first and second protruding members have substantially the same height with respect to the valve seat, or in other words, extend with substantially the same height from the valve seat.

Preferably, a height difference between the lower surface of the valve member at a first edge and a second edge opposite the first edge is 0.005 to 0.1 mm, preferably 0.01 to 0.03 mm, more preferably approximately 0.02 mm.

It is noted that although a combination of an asymmetrical lower surface and the concave shape of the valve member allows a very reliable, for instance due to reduced vibrations, valve member, it may also be possible to provide an asymmetrical valve member as described above without a valve member being concave.

The fluid flow regulator may further comprise a non-return valve. It may be an advantage of the present invention that the non-return valve reduces the likelihood that, in use, the fluid flow might induce legionella's disease. The non-return valve may comprise one or more seals. The material of these seals may be chosen to reduce the risk that the one or more seals harbour legionella's disease.

The fluid flow regulator typically further comprises a resistance controller, downstream of the valve member. The resistance controller may be referred to as a fluid flow controlling mechanism. The resistance controller is typically at the fluid outlet of the fluid flow regulator. The resistance controller is typically used to control the pressure of fluid in the part of the valve chamber that is downstream of the valve element, in particular allowing regulating the pressure-drop over the valve element. In use, the resistance controller normally restricts the flow of fluid out of the valve chamber, thereby helping to control the back-pressure acting on the downstream side of the valve member, in doing so, helping the fluid flow regulator to provide the at least substantially pressure-independent fluid flow. The substantially pressure-independent fluid flow may be pressure-independent fluid flow.

In use, fluid enters the valve chamber and pushes down on the valve member, preferably towards the valve seat. Fluid flows past the valve member and valve seat, flowing through the gap, or throughflow opening, between the valve member and valve seat. The valve seat preferably has an inclined upper surface, whereby a first component of a tangential of the upper surface is substantially opposite to the overall direction of fluid flow and a second component of the tangential of the upper surface is in a radial direction towards the longitudinal axis of the valve chamber. Hereby, the fluid flow passing between the valve member and valve seat generates a force on the downstream side of the valve member that comprises a component substantially opposite to the overall direction of fluid flow (i.e. the direction from the inlet to the outlet), such that the valve member is preferably at least partly supported by the fluid flow passing the valve member. The greater the pressure, and thereby the fluid force, on the overall upstream side of the valve member, the more the valve member moves towards the valve seat. Thereby, the throughflow opening between the valve member and the valve seat is decreased, such that, with a substantially constant throughflow of fluid through this smaller opening, the velocity of the fluid passing through the throughflow opening increases. The increase in fluid velocity thus results in an increase of the force acting on the downstream side of the valve member, such that a greater support force on the overall downstream side of the valve member is obtained. Hereby, the flow itself has a balancing effect on the valve member, such that a substantially constant fluid flow can be obtained over a relatively large range of fluid pressures supplied at the inlet. Also, in combination with the resistance controller (or fluid flow regulator) that can be arranged on the outlet, the restricted fluid flow through the fluid flow regulator downstream of the valve member limits the pressure drop over the valve member, thereby the valve member is also supported by the back pressure of the fluid downstream of the valve member.

It may be an advantage of the present invention that the fluid flow regulator can operate like this over a wide range of fluid flow rates and/or fluid pressures and during which the fluid flow out of the fluid flow regulator remains at a substantially constant flow rate and/or volume. The fluid flow out of the fluid flow regulator may be at a constant flow rate and/or volume.

It may be an advantage of the present invention that in use the fluid flow out of the fluid flow regulator remains at a substantially constant flow rate and/or volume when the flow rate and/or pressure of fluid into the fluid control device is one or more of low, high, increasing or decreasing. The fluid flow out of the fluid flow regulator is typically at a constant flow rate and/or volume.

According to a further aspect, there is provided a method for manufacturing a fluid flow regulator as described above, comprising the steps of:

providing a valve member;

shaping the valve member concave and/or forming the lower surface of the valve member to have an asymmetrical height distribution;

providing a valve chamber of the fluid regulator; and assembling the valve member and the valve chamber for forming the fluid flow regulator.

By adjusting the concave shape and/or the lower surface in terms of symmetry, a reliable fluid flow regulator is provided as explained above. Shaping the valve member may include stamping the valve member, for instance between accordingly shaped forming elements. The forming elements may define a concave and/or asymmetrical chamber there between for forming the valve member.

In a preferred embodiment of the method for manufacturing, the method further comprises the steps of:

determining a stiffness parameter of the valve member;

designing, based on the determined stiffness parameter, the concave shape and/or shape for the asymmetrical height distribution of the lower surface of the valve member prior to shaping the valve member.

By basing the concave shape and/or shape for the asymmetrical height distribution of the valve member on a determined stiffness parameter of the valve, or of a raw material from which the valve member is formed, the production process is able to be adapted to a varying properties of the raw material supplied. For example, obtaining steel, in particular suitable spring steel, in an exact predefined thickness can cause significant additional costs in the production process, or result in additional waste due to unsuitably produced material batches. By designing the concave shape and/or shape for the asymmetrical height distribution of the valve member in dependence of the actual determined (e.g. measured) thickness of a batch of steel plate/strip, valve members, and thereby fluid flow regulators, with substantially equal performance can be obtained from different batches of steel strips, with varying thicknesses. Hereby, waste and/or costs of the production process can be reduced.

The method may further include the step of determining the stiffness parameter of the shaped valve member, comparing the stiffness parameter with a predetermined target stiffness parameter and adapting the design of the valve member based on the comparison. This allows adapting the valve member to a target stiffness in an iterative process.

Alternatively, or additionally, a preferred embodiment of the method comprises the steps of:

determining a stiffness parameter of the valve member;

adapting, based on the determined stiffness parameter, a dimension, shape and/or location of the valve seat which determines a geometry, such as the width and length, of a throughflow opening between the valve element and the valve seat.

Hereby, a variation in the stiffness and/or bending properties of a valve member can be compensated for by adapting the shape and/or location of the valve seat instead of, or in conjunction with, designing and/or modifying the specific shape of the valve member as discussed above. Again, waste and/or costs of the production process can be reduced and a more adaptable production process is obtained.

Preferably, the step of adapting a dimension, shape and/or location of the valve seat comprises adapting a dimension, shape and/or the location of at least one protrusion arranged on the valve seat which limit the movement of the valve element towards the valve seat. The protrusion arranged on the valve seat can be adapted relatively easily in a mould for forming the valve chambers, such that the flow characteristics of the flow regulator can easily be adapted, based on the determined stiffness parameter, to the desired specification.

An embodiment of the present invention will now be described by way of example only and with reference to the accompanying drawings, in which.

Figure 1:
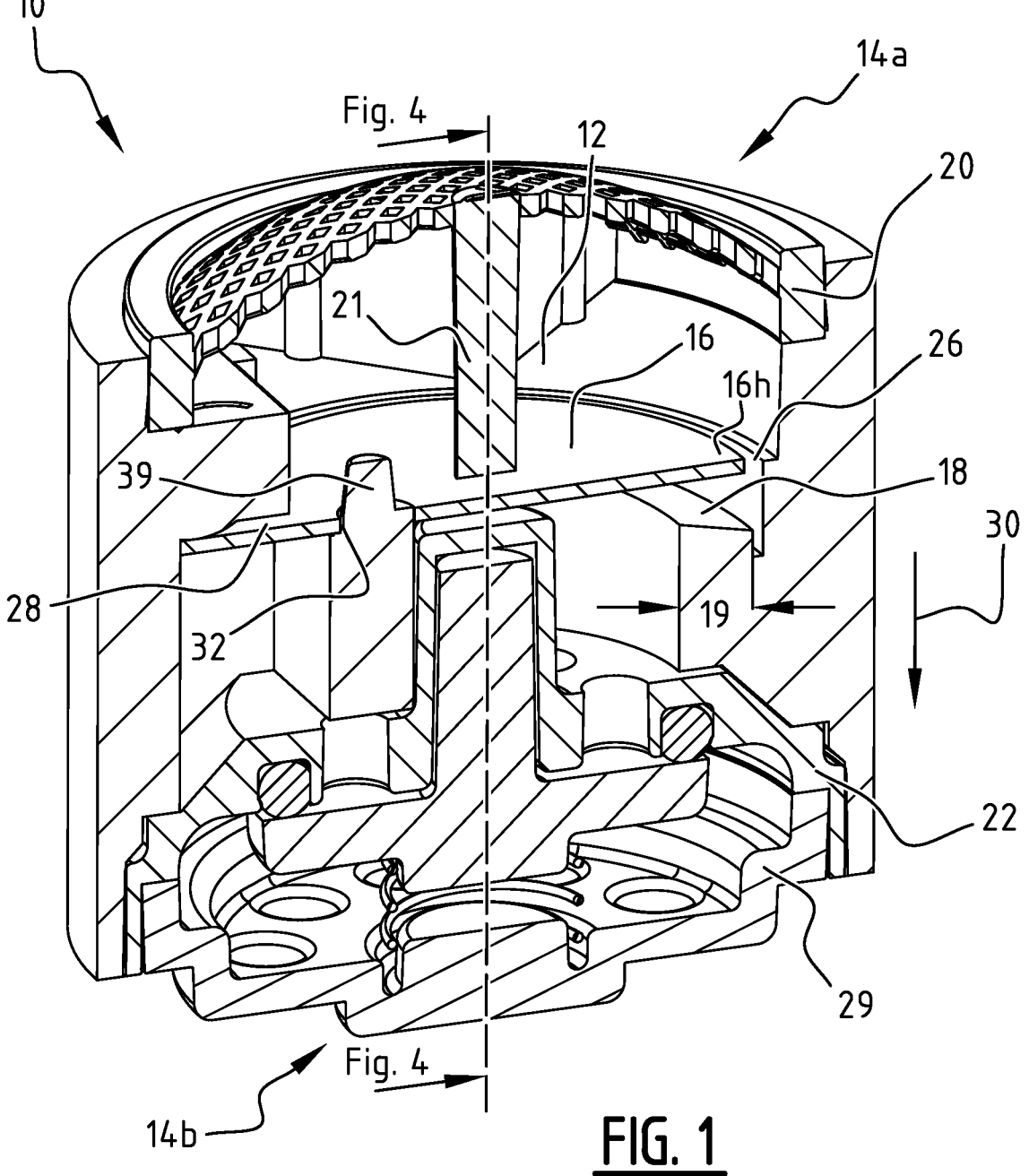
FIG. 1 is a cross-sectional view of a fluid flow regulator.

FIG. 1 shows a cross-sectional view of a fluid flow regulator 10. The fluid flow regulator 10 comprises a valve chamber 12 having a fluid inlet 14a and a fluid outlet 14b. There is a valve member 16 inside the valve chamber 12. The valve member 16 is moveable inside the valve chamber 12 and contactable with a valve seat 18 inside the valve chamber 12. Importantly, the valve member 16 is concave in shape. FIG. 1 does not show fluid in the fluid flow controller 10.

The fluid flow regulator 10 may be referred to as a dynamic fluid flow regulator. That is because the valve member 16 is moveable relative to the valve chamber 12. This contrasts with widely available pressure-fall dependent fluid flow regulators.

The fluid flow regulator 10 includes a strainer 20 at the top or fluid inlet 14a of the fluid flow regulator. The fluid flow regulator 10 includes a non-return valve 22 and resistance controller 29 at the bottom or fluid outlet 14b of the fluid flow regulator. The non-return valve 22 may be referred to as a check valve. The strainer 20 has a pin 21 that helps to keep the valve member 16 in the valve chamber 12.

The strainer 20 at the top or fluid inlet 14a of the fluid flow regulator 10 helps to stop larger solid particles from entering the valve chamber 12. The holes in the resistance controller 29 at the bottom or fluid outlet 14b of the fluid flow regulator 10 are larger than the holes in the strainer 20 at the top or fluid inlet 14a of the fluid flow regulator, so that solid particles do not accumulate in the fluid flow regulator 10. Solid particles that get into the fluid flow regulator 10 typically therefore also come out.

The valve member 16 is concave in the direction of the fluid inlet 14a and convex in the direction of the fluid outlet 14b.

In use, the valve member 16 moves inside the valve chamber 12 and is contactable with the valve seat 18 inside the valve chamber. The valve member 12 is moveable relative to the valve seat 18. The valve seat 18 preferably has a radial width 19 of 1.97 mm.

In use, the resistance controller 29 is used to control or influence the backpressure of fluid (not shown) in the valve chamber. The resistance controller 29 restricts the flow of fluid out of the valve chamber 12 to create a higher back-pressure.

In use, fluid (not shown) enters the valve chamber 12 and pushes down on the valve member 16. Some fluid flows past the valve member 16 and valve seat 18, flowing through the gap 26 between the valve member 16 and valve seat 18. Because of restricted fluid flow through the fluid flow regulator 10 downstream of the valve member 16, for instance caused by the resistance controller 29 some of the fluid (not shown) that has flowed past the valve member 16 and valve seat 18, pushes back against the valve member 16, against the overall direction of fluid flow, shown by the arrow 30, because of the shape of the seat. The greater the fluid force and pressure on the upstream side of the valve member 16, the greater the fluid support from the down-stream side of the valve member. If the fluid force and pressure on the upstream side of the valve member 16 is reduced, the fluid support from the downstream side of the valve member is also reduced.

The arrow 30 shows the overall direction of the flow of fluid and the longitudinal axis of the valve chamber 12.

The valve member 16 has a tab 28 (see also FIG. 2) that is used to locate the valve member inside the chamber 12. The valve member 16 also has an aperture 32 in it for positioning the valve member inside the valve chamber 12. The valve chamber 12 has a post 34, the aperture 32 in the valve member 16 is located over the post 34. That is the post 34 is passable through the aperture 32 when the valve member 16 is inside the valve chamber 12.

Figure 2:
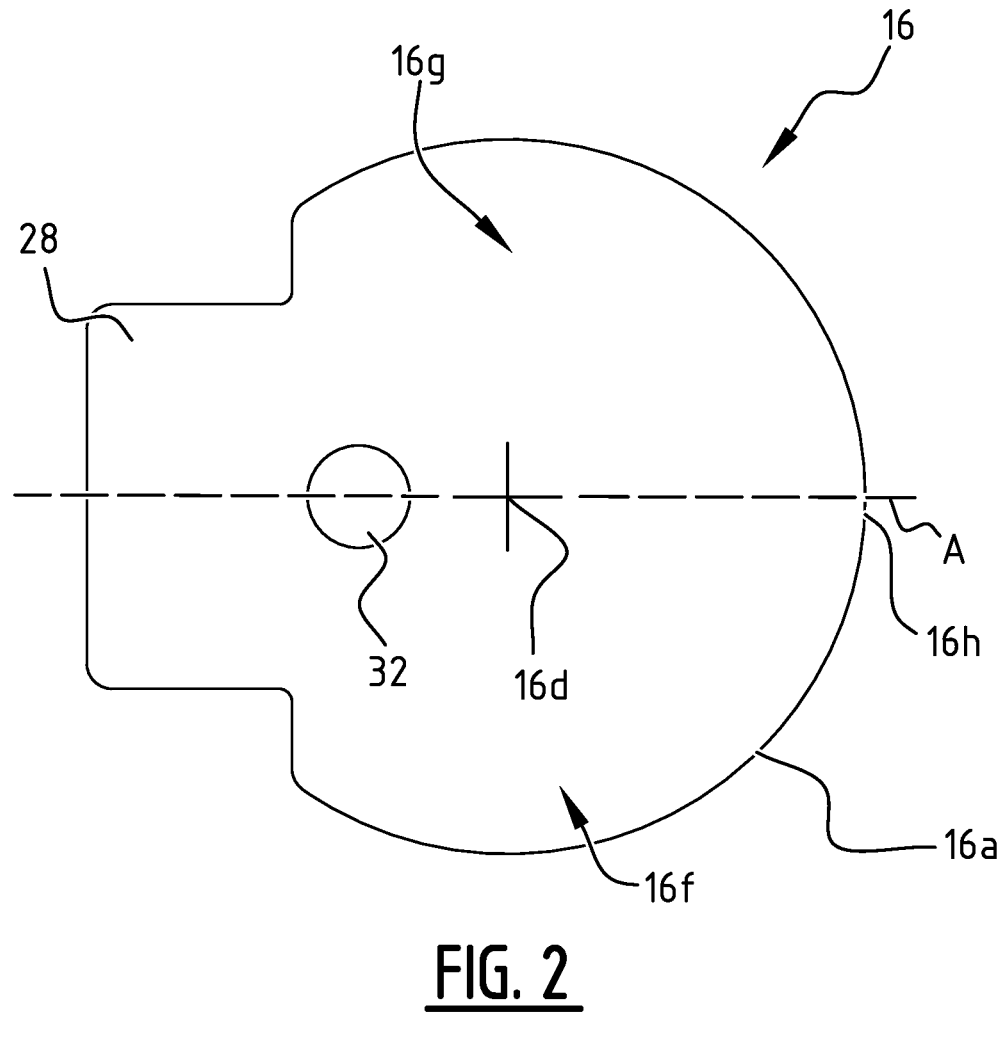
FIG. 2 is a plan view of a valve member.

FIG. 2 is a plan view of a valve member 16, of preferably the 7.8 L/min version, of the fluid flow regulator according to the present invention. An outer edge 16*a* of the valve member 16 is substantially circular. The radius of the valve member is preferably 6.97 mm FIG. 2 shows the concave face of the valve member 16 that faces the inlet (i.e. is in the direction of and/or adjacent to the fluid inlet). The convex face of the valve member 16 that faces the outlet (i.e. is in the direction of and/or adjacent to the fluid outlet) is not shown. The lowermost surface or lowermost point of the valve member 16 is at a mid-point 16*d* on line A between an outermost surface of the tab of the valve member and an opposing outmost edge 16*h* of the valve member 16.

Figure 3:
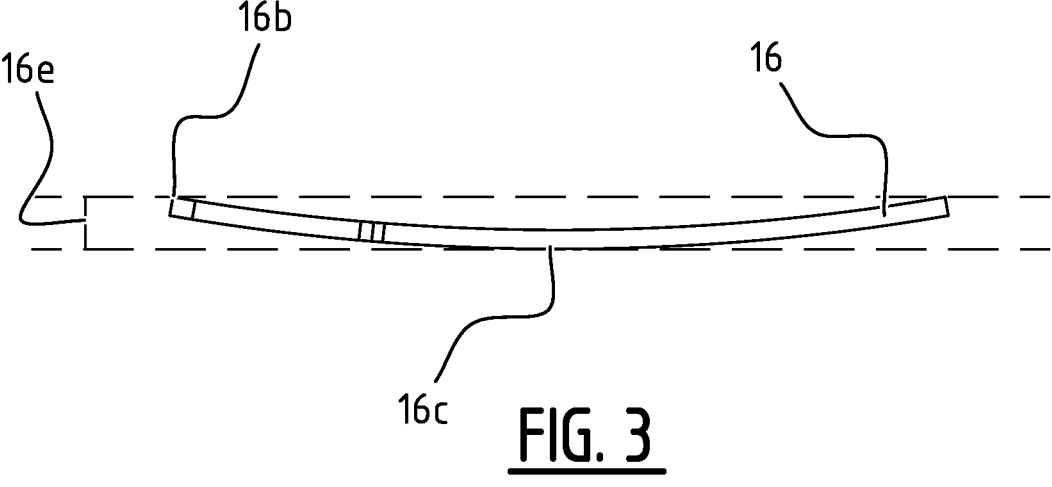
FIG. 3 is a cross-sectional view of the valve member.

FIG. 3 is a cross-sectional view along line A in FIG. 2 of the valve member 16, of preferably the 7.8 L/min version, of the fluid flow regulator according to the present invention. The average thickness of the valve member is preferably 0.392 mm±0.02 mm. The valve member 16 is curved such that the perpendicular distance 16*e* from a line parallel with a lowermost surface 16*c* of the convex side of the valve member that faces the outlet and an uppermost edge 16*b* of the concave side of the valve member that faces the inlet is preferably 0.39 mm, which is, preferably 0.02 mm, more than the average thickness of preferably 0.37 mm of the valve member.

Figure 4:
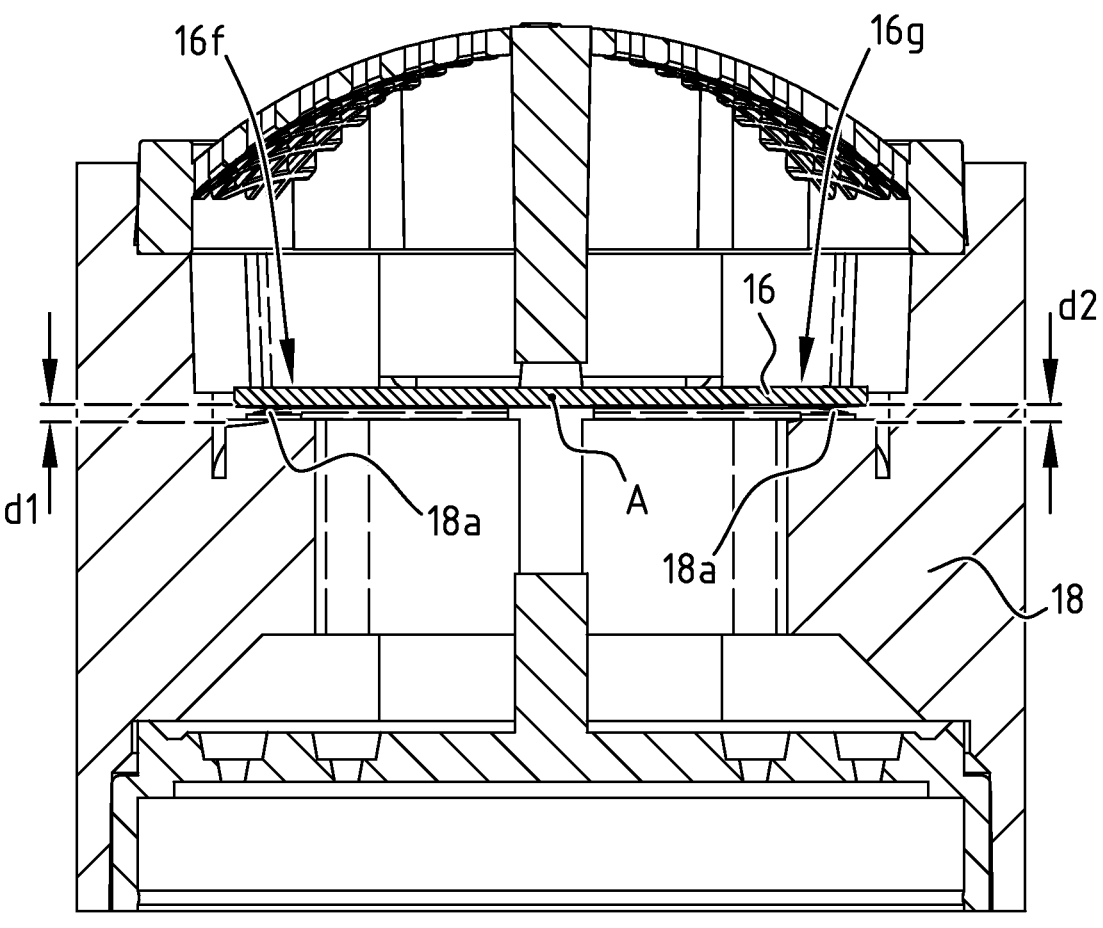
FIG. 4 is a cross-sectional view of fluid flow regulator along line IV in FIG. 1.

FIG. 4 shows a cross-sectional view along arrows IV in FIG. 1. In this figure, it is visible that the lower surface of the valve member 16 is formed asymmetrical, seen in a plane perpendicular to the line A (between tab 28 and opposite edge 16*h*) in FIG. 3, wherein line A can be seen as a line of substantial mirror symmetry of the respective valve seat. That it, the lower surface at a first edge portion 16*f* (see also FIG. 2) is located out of the plane of the lower surface at a second edge portion 16*g*. Edge portion 16*g* is located lower than edge portion 16*f*. The distance d2 between the lower surface of the valve member 16 at the edge portion 16*g* and the valve seat 18 is thus smaller than the distance d1 between the lower surface of the valve member 16 at the edge portion 16*f* and the valve seat 18. The difference between distance d1 and d2 is preferably 0.03 mm in this example.

It is further visible that the valve seat 18 is provided with protrusions 18*a* which protrude from the surface of the valve seat 18. Protrusions 18*a* limit movement of the valve member 16 towards the valve seat 18 and ensure that a flow opening 26 between valve member 16 and valve seat 18 will remain. The protrusions 18*a* extend in the same cross-sectional plane as shown in FIG. 4. Multiple pairs of protrusions may be arranged, each pair extending in a plane parallel to the plane as shown in FIG. 4, i.e. a plane substantially perpendicular to the line A in FIG. 2. In use, when the valve member 16 bends due to an increased fluid pressure, the opposite edge 16*h* (see FIG. 2) will have the greatest travel length, edge portions 16*f* and 16*g* will contact the symmetrically arranged protrusions 18*a* valve seat 18 at different pressures due to asymmetrical (with respect to line A) lower surface of the valve member 16. This will reduce the occurrence of vibrations, which could otherwise occur when the valve member 16 would contact the protrusions 18*a* at substantially equal pressures.

Modifications and improvements can be incorporated herein without departing from the scope of the invention.

The invention claimed is:

1. A fluid flow regulator comprising:
  a valve chamber having a fluid inlet and a fluid outlet; and
    a valve member inside the valve chamber, wherein the valve member is moveable inside the valve chamber relative to a valve seat defining a flow opening there between,
    wherein at least in a resting position, a distance between a first edge of the valve member and the valve seat is different from a distance between a second edge opposite the first edge of the valve member and the valve seat, said opposite edges being defined as being on opposite sides of a line of substantial mirror symmetry of the respective valve seat.

2. The fluid flow regulator according to claim 1, wherein the valve member is concave.

3. The fluid flow regulator according to claim 1, wherein the valve seat comprises at least one protrusion arranged to limit the movement of the valve member towards the valve seat.

4. The fluid flow regulator according to claim 1, wherein a lowermost surface of the valve member has an asymmetrical height distribution relative to the valve seat.

5. The fluid flow regulator according to claim 1, wherein the valve member comprises a tab for locating the valve member inside the chamber, the tab being locatable with a portion of the valve chamber.

6. The fluid flow regulator according to claim 5, wherein seen in a cross-sectional plane perpendicular to a line between an outermost surface of the tab and an opposing outmost edge of the valve member, at least in the resting position, a lowermost surface of the valve member has an asymmetrical shape relative to the valve seat.

7. The fluid flow regulator according to claim 1, wherein seen in a cross-sectional plane perpendicular to a line between an outermost surface of the tab and an opposing outmost edge of the valve member, at least in the resting position, a distance between the first edge portion of the valve member and the valve seat is different from a distance between the second edge portion opposite the first edge portion of the valve member and the valve seat.

8. The fluid flow regulator according to claim 1, wherein a height difference between the lowermost surface of the valve member at the first edge and the second edge opposite the first edge is 0.005 to 0.1 mm.

9. The fluid flow regulator according to claim 1, wherein the valve member is deformable, such that in use the shape of the valve member is changeable.

10. The fluid flow regulator according to claim 1, wherein a first edge of the valve member is located out of a plane of a second edge opposite the first edge of the valve member, wherein the plane is disposed at a distance from the valve seat.

11. A fluid flow regulator comprising:

a valve chamber having a fluid inlet and a fluid outlet; and a valve member inside the valve chamber, wherein the valve member is moveable inside the valve chamber relative to a valve seat defining a flow opening there between, wherein the valve member is concave towards the fluid inlet, wherein the valve seat comprises at least one protrusion arranged to limit the movement of the valve member towards the valve seat and prevent full closure of the flow opening, and wherein the valve member is comprised of steel.

12. The fluid flow regulator according to claim 11, wherein the valve member is substantially circular.

13. The fluid flow regulator according to claim 12, wherein a radius of the valve member is from 3.5 to 10 mm.

14. The fluid flow regulator according to claim 11, wherein the valve seat has a width of from 1.75 to 2.25 mm.

15. The fluid flow regulator according to claim 11, wherein the valve member is deformable, such that in use the shape of the valve member is changeable.

16. The fluid flow regulator according to claim 11, wherein the valve member is concave such that the perpendicular distance from a line parallel with a lowermost surface of the convex side of the valve member and an uppermost edge of the concave side of the valve member is from 0.005 to 0.1 mm, more than an average thickness of the valve member.

17. The fluid flow regulator according to claim 16, wherein the valve member comprises a tab for locating the valve member inside the chamber, the tab being locatable with a portion of the valve chamber and the lowermost surface of the valve member is at a mid-point between an outermost surface of the tab and an opposing outmost edge of the valve member.

18. The fluid flow regulator according to claim 11, wherein the valve member is convex in a direction of the fluid outlet.

19. The fluid flow regulator according to claim 11, wherein the valve member is shaped concave prior to arranging said valve member in said valve chamber, such that said valve member is not flat.

20. The fluid flow regulator according to claim 11, wherein the valve member is movable under the influence of pressure of the fluid inside the valve chamber to and from the valve seat, defining the flow opening there between, and arranged to adjust the size of the flow opening in dependence of the pressure of the fluid and/or flow rate.

21. A fluid flow regulator according to claim 11, wherein, upon increasing fluid pressure, the valve member will move towards the valve seat to decrease the flow opening.

22. A fluid flow regulator comprising:

a valve chamber having a fluid inlet and a fluid outlet; and a valve member inside the valve chamber, wherein the valve member is moveable inside the valve chamber relative to a valve seat defining a flow opening there between, wherein the valve member is concave towards the fluid inlet, wherein the valve seat comprises at least one protrusion arranged to limit the movement of the valve member towards the valve seat and prevent full closure of the flow opening;

wherein the valve member comprises a tab for locating the valve member inside the chamber, the tab being locatable with a portion of the valve chamber, and wherein the lowermost surface of the valve member is at a mid-point between an outermost surface of the tab and an opposing outmost edge of the valve member.

* * * * *